United States Patent [19]

Boos

[11] Patent Number: 4,863,361
[45] Date of Patent: Sep. 5, 1989

[54] SLIT-TYPE NOZZLE FOR AN EXTRUDER

[76] Inventor: Sigmund Boos, Hinter Bühl 14, D-7709 Hilzingen, Fed. Rep. of Germany

[21] Appl. No.: 194,931

[22] Filed: May 17, 1988

[30] Foreign Application Priority Data

Feb. 24, 1988 [DE] Fed. Rep. of Germany ....... 3805774

[51] Int. Cl.⁴ .................... B28B 17/00; B29C 47/16
[52] U.S. Cl. .................................. 425/141; 264/40.1; 264/176.1; 425/381; 425/461; 425/466; 425/192 R
[58] Field of Search ............... 425/140, 141, 466, 461, 425/381, 192.1, 190; 264/40.1, 216, 176.1

[56] References Cited

U.S. PATENT DOCUMENTS

| | | | |
|---|---|---|---|
| 3,039,143 | 6/1962 | Nicholson | 425/466 |
| 3,293,689 | 12/1966 | Chiselko et al. | 425/466 |
| 3,496,257 | 2/1970 | Brown et al. | 264/40 |
| 3,702,751 | 11/1972 | Mehnert | 425/190 |
| 3,711,235 | 1/1973 | Bunte et al. | 425/466 |
| 3,829,274 | 8/1974 | Melead | 425/466 |
| 3,836,313 | 9/1974 | Stafford | 425/463 |
| 3,941,551 | 3/1976 | Marion | 425/463 |
| 4,003,689 | 1/1977 | Harrison et al. | 425/466 |
| 4,124,342 | 11/1978 | Akatsuka et al. | 425/141 |
| 4,298,325 | 11/1981 | Cole | 425/192 R |
| 4,507,073 | 3/1985 | Shelton | 425/466 |
| 4,514,348 | 4/1985 | Iguchi et al. | 264/40.1 |
| 4,594,063 | 6/1986 | Reifenhäuser et al. | 425/141 |

FOREIGN PATENT DOCUMENTS 2162119A  1/1986  United Kingdom ................ 425/466

Primary Examiner—Jay H. Woo
Assistant Examiner—Khanh P. Nguyen
Attorney, Agent, or Firm—Bachman & LaPointe

[57] ABSTRACT

A slit nozzle for an extruder has a nozzle orifice defined by two side surface portions of the nozzle body, at least one of the side surface portions being in the form of a flexible lip portion connected to an adjusting arrangement for varying the width of the nozzle orifice. The adjusting arrangement includes at least one lever arm connected at one end to the lip portion and at its other end to a mechanical adjusting means including a screw operable to control deflection movement of the lever arm in a plane which extends transversely with respect to the side surface portions.

33 Claims, 3 Drawing Sheets

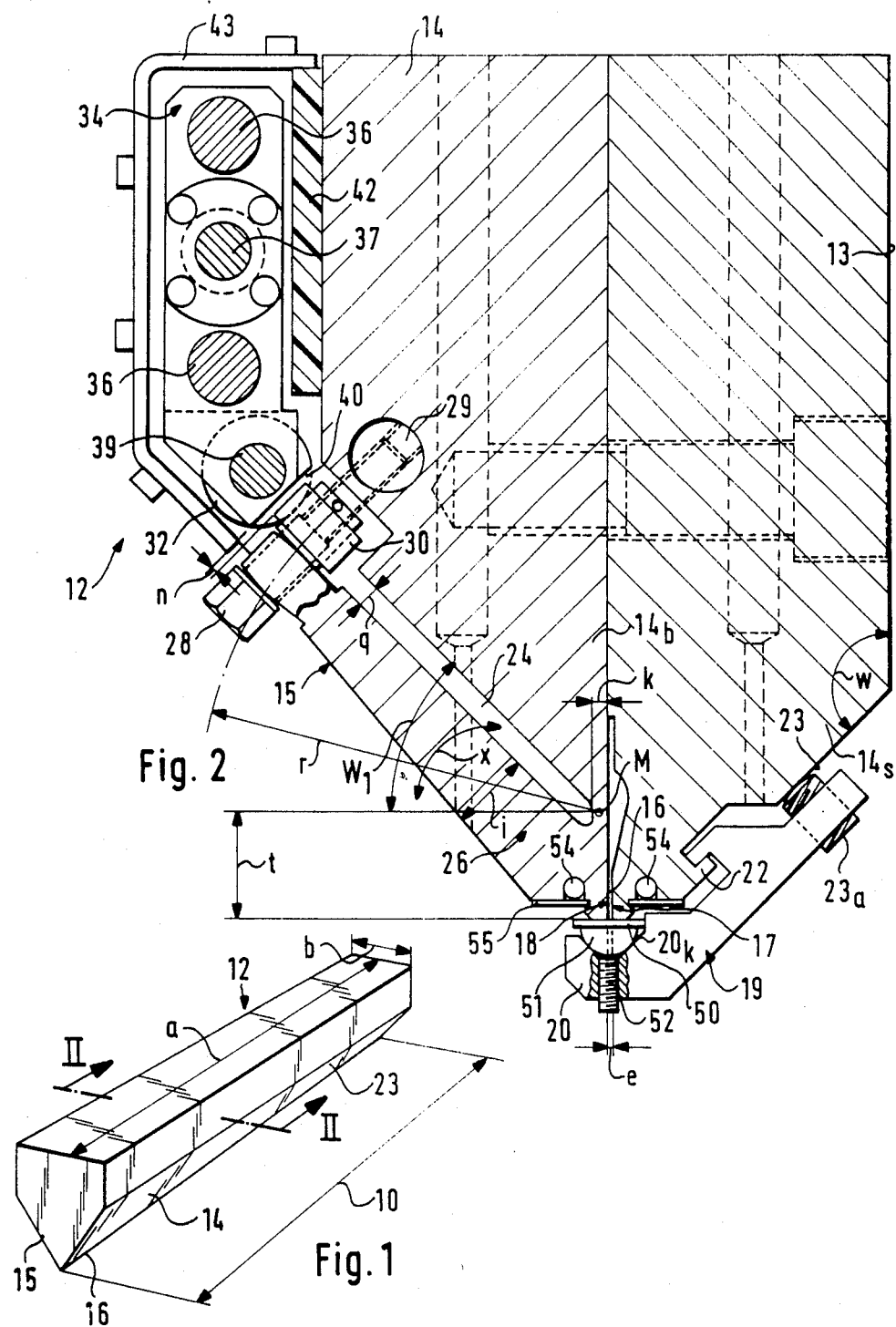

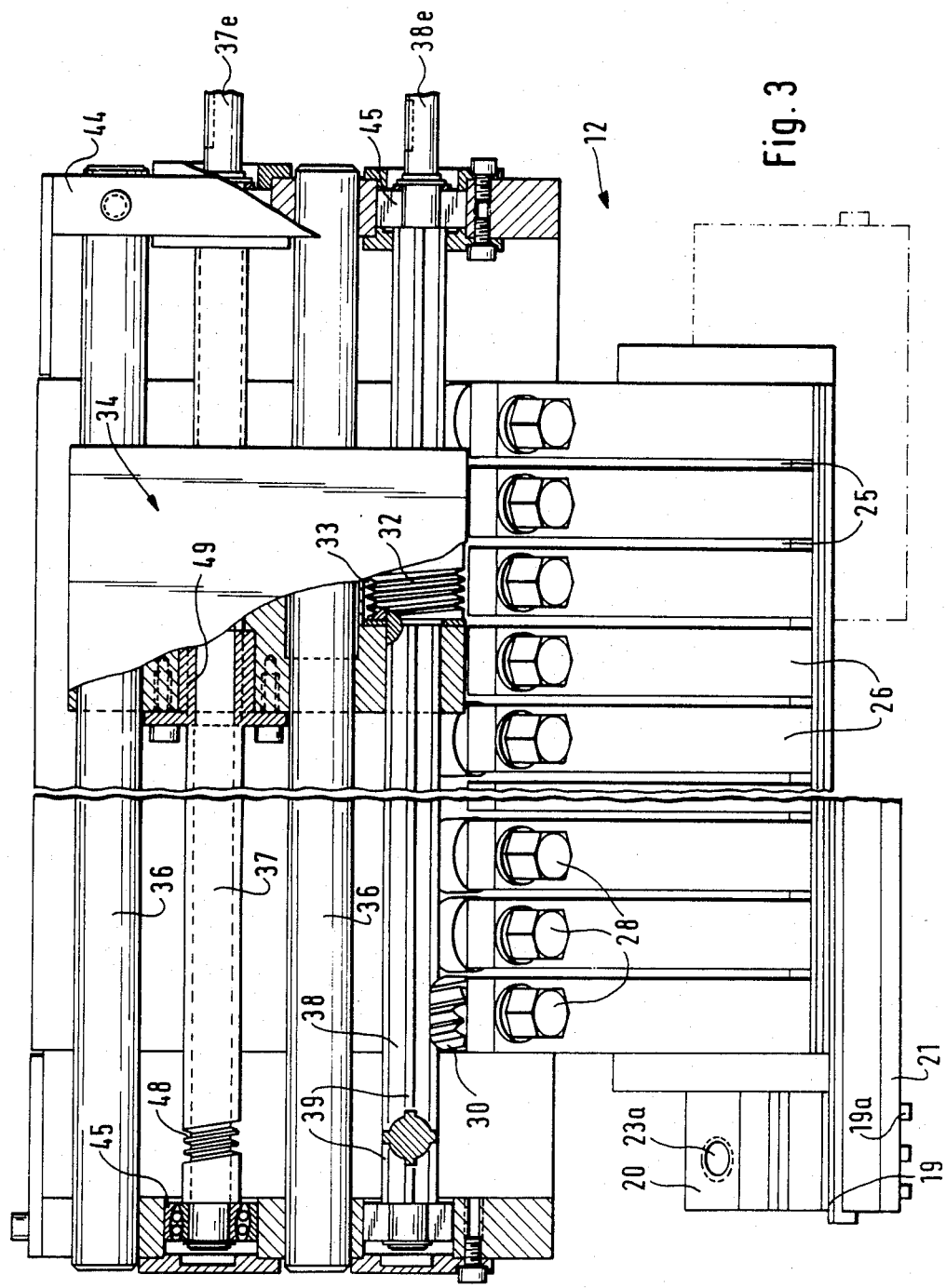

SLIT-TYPE NOZZLE FOR AN EXTRUDER

BACKGROUND OF THE INVENTION

Extruders are used in many situations in the plastic-processing industry, for example with plastic material in a condition in which it is capable of flow being extruded through a slit nozzle which, as its name implies, is a nozzle construction in which the outlet orifice for the plastic material is in the form of a slit which may be of substantial length. When the orifice is of considerable length, such a nozzle may be referred to as a wide-slit nozzle. This means that, irrespective of the transverse width of the slit, that is to say the dimension thereof perpendicularly to its longitudinal direction, the slit is formed in a long nozzle body for producing extruded articles of very substantial width.

Thus for example a slit nozzle may be used for coating a support or backing material with a plastic material or for producing films, foils, plates or wide shaped members. One form of such a nozzle comprises a nozzle orifice which is defined by two side surfaces of the nozzle body, at least one of the side surfaces being in the form of a flexible lip which is connected to an adjusting means for varying the width of the nozzle orifice, thereby to vary the thickness of the layer of plastic material or film or the like produced by that nozzle. Thus, when the transverse dimension of the nozzle orifice is reduced or increased, the nozzle produces an extrusion of the desired thickness, over the entire length of the nozzle which is therefore the dimension thereof which is transverse with respect to the direction of movement of the extruded article produced by the nozzle. A nozzle orifice may be produced with precisely the required dimensions to give a desired thickness of extruded article. However, this may not guarantee that the extruded article is always produced with the desired thickness. For example, differences in regard to thermal conditions within the molten plastic material may cause the extruded article to be of greater or smaller thickness, when it leaves the nozzle orifice. That in turn may adversely affect the quality of the article produced by the nozzle.

The thicknesses of the extruded articles produced by means of a wide, shaped or round slit nozzle may be measured by suitable equipment for measuring the thicknesses of the articles or the thicknesses of the layers produced by the nozzle. The thickness of the extruded material may be measured continuously over the width thereof. In the case of materials which are extruded as an extruded article or produced in the form of a coating on a backing material. Conventional measuring equipment can indicate the thickness values as measured by the equipment, in optical or graph form, and can thus reproduce the precise position and also the magnitude of any deviation from the desired thickness.

In the slit nozzle referred to above, at least one lip forming one of the side surfaces of the nozzle orifice is flexible and thus bendable. In order to produce movement of the flexible lip, thereby to vary the size of the nozzle orifice, the apparatus in which the nozzle is used may include components which an influence the shape of the lip connected thereto, by way of a change in length which is dependent on temperature, voltage or current. Fitted into the apparatus in the region of the flexible lip are elements which, when the determining parameter to be measured is heat, are in the form of metal pins. The metal pins are caused to expand by the heat, and thus undergo an increase in length, decreasing in length again when they cool down. By virtue of the measurement taken in that way it will be seen that correction of the thickness of the extruded material is required in one region of the apparatus or another so that the operative width of the nozzle orifice can be altered at the appropriate locations by activating the appropriate control component. For that purpose, it is necessary that the flexible lip can be moved towards or away from the other side surface of the nozzle orifice, so as to vary the operative width thereof.

The control elements are distributed at close spacings over the dimension of the nozzle corresponding to its longitudinal extent. These control elements during the working process are always in the same positions relative to the measuring points of the measuring equipment. In that way the measuring system can apply a correction command to the respective element at which adjustment is required.

In the start-up phase of a production process, major corrections may usually be required, which can also cause a delay in starting actual production and which in particular result in the nozzle producing an extruded material or article which is generally useless because it is not of the precisely required dimensions. During actual production, only minor alterations generally have to be made, once the nozzle orifice configuration is appropriately set.

In the event of a break in the production process, for example due to the extruder running out of material, because of a defect in the equipment or as a result of small batch sizes, the extruder may have to be cut back in its output. When that happens, the automatic system providing for regulation in response to temperature is disturbed and even when breaks in operation are of short duration, that system may become unstable.

In addition, in the case of the thermal regulation system described above, the metal pin in question must always be kept at a certain temperature in order to be able to yield to provide for a required opening of the nozzle orifice; the temperature has to be reduced in order to be able to shorten the length of the pin. In order to accelerate that operation of reducing the length of the pin by virtue of a drop in temperature, all the pins always have cooling air flowing around them, to cover the situation that one or other of the pins has to be cooled down. However that results in a considerable level of expenditure in respect of energy which has to be continuously supplied to the equipment and thus wasted.

SUMMARY OF THE INVENTION

An object of the present invention is to provide a slit nozzle which is adapted to give precise setting of the operating width of the slit orifice, over the entire length thereof, by an automatic procedure involving a very low level of consumption of energy.

Another object of the present invention is to provide a slit nozzle for an extruder, which is sensitive in its response to a requirement for adjustment of its nozzle orifice width.

Still another object of the present invention is to provide a slit nozzle for an extruder, which while being of a simple construction can provide for delicate and accurate control of the size of the nozzle orifice.

In accordance with the invention, those and other objects are attained by a slit nozzle, for example a wide-slit nozzle, for an extruder, having a nozzle orifice which is defined by first and second side surface portions of the nozzle body. At least one of the side surfaces is in the form of a flexible lip portion and is operatively connected to an adjusting means for varying the width of the nozzle orifice, by flexing of the flexible lip portion. The adjusting means comprises at least one lever arm which is operatively connected at its one end to the flexible lip portion while its other end is connected to a mechanical control or setting means for producing deflection movement of the lever arm in a plane extending transversely with respect to the side surfaces of the nozzle body.

In a preferred embodiment of the construction according to the invention, the lever arm is formed at one end on the side surface portion forming the flexible lip portion, and is partially separated from the nozzle body by a gap which extends longitudinally in the nozzle body. The gap terminates at a small spacing from the nozzle orifice defining the nozzle slit. A notional rotary axis in respect of the limited movement of the flexible lip portion extends between the nozzle slit orifice and the deepest or lowest point of the gap between the body of the nozzle and the above-mentioned lever arm.

In a preferred embodiment the arrangement may have a plurality of the above-mentioned lever arms, being for example about ten in number, which are separated from each other by narrow transverse slots. Each of those lever arms is adjusted independently by the adjusting means so that the region of the side surface portion forming the flexible lip portion, which is formed on the respective lever arm at the end thereof, is rotatable substantially about the above-indicated rotary axis, to a very small degree. It will be appreciated that that arrangement makes it possible to provide for appropriate and highly differentiated setting of the width of the slit nozzle orifice, over the length thereof.

Instead of the plurality of lever arms being formed from the body of the nozzle, for example by virtue of the provision of a plate-like configuration which is then divided into the individual lever arms by the above-mentioned separating slots therebetween, it is also possible in accordance with the invention to use other forms of lever arm assemblies, which are for example fixed to the flexible lip portion as by screwing, welding or the like, and/or which are made up a plurality of components. With all such arrangements adjustment of the magnitude of the nozzle slit orifice may be effected by way of the system of levers which provides a step-down effect in the transmission of movement from the mechanical setting means to the lip portion of the nozzle orifice, while also providing for precise mechanical fixing of the size of the nozzle orifice.

At the free end of the lever arm, that is to say at the end remote from the lip portion, the cross-sectional thickness thereof preferably corresponds to about two or three times the width of the nozzle slit orifice. That configuration thus restricts the deflection movement of the lower arm in an upward direction, but the slit width is such that the lever arm does not touch the nozzle body even in the position of maximum deflection of the lever arm.

In another preferred feature of the invention the setting means for the lever arm comprises a pin or bolt which is mounted with its free end in the nozzle body and which is operable to vary the size of the slit orifice of the nozzle; the free end of the lever arm can thus be moved by means of the pin or bolt and can also be set in the adjusted position by means thereof.

It may be particularly advantageous for the pin or bolt to be in the form of an adjusting screw and for the adjusting screw to be mounted with its free end in a screwthreaded hole in the nozzle body or an insert therein. The configuration of the screwthread pitches on the adjusting screw/screwthreaded hole provides means for adjustment of the position of the lever arm and thus the position of the flexible lip portion.

In principle, by means of the adjusting screws it is possible to set the lever arm in the desired position by hand. As however automatic regulation is often preferable, the invention may further provide that disposed on each adjusting screw or pin is a ring gear means which extends into the path movement of a gear displaceable on a spindle in the longitudinal direction of the nozzle. Thus, depending on the position of the gear on the spindle, it can be brought into mesh with a selected one of the ring gear means on the adjusting screws.

A preferred arrangement has a ring gear means which can be pushed on to and fixed on the shank of the respective adjusting screw; the free end of the lever arm can be held in a fixed position between the ring gear means and the head of the screw.

In accordance with another preferred feature of the invention the above-mentioned gear which is displaceable in the longitudinal direction of the nozzle is axially movable on a drive bar or spindle of the nozzle and can be rotated by rotary movement of the drive spindle. The gear may be carried by a carriage which is displaceable in the longitudinal direction of the nozzle body, to vary the position of engagement of the gear, and both the movement of the carriage and the movement of the gear may be produced by hand. In that connection it is desirable for the teeth of the ring gear means on the respective adjusting screw and the screw configuration on the gear on the spindle to converge in a point at their end, as viewed in cross-section.

In order to ensure that, upon movement of the gear in the longitudinal direction of the nozzle, the gear does not have to be lifted out of the region of engagement with the ring gear means on the respective screws, the gear is interrupted at its periphery by the provision of a surface portion defined by the removal of a segment-like portion, that surface portion extending at a small spacing from the ring gear means, when the gear is in its position for displacement longitudinally of the nozzle. That arrangement thus provides a given position of the gear for travel thereof, to permit the gear to move without clashing with the respective ring gear means. When the gear on the spindle has been set to the appropriate position, it can then be rotated to bring it into engagement with the respective ring gear means on the appropriate screw.

As mentioned above, the gear for actuating the screws may be arranged in a carriage which is movable on guide bars or rods which extend parallel to the longitudinal dimension of the nozzle slit, and is moved by a drive rod or bar engaging with an external screwthread into an internal screwthread in the carriage. It will be appreciated that both that association of screwthreads and the design configuration thereof as well as the number of thread turns per unit of length and the pitch of the gear on the spindle and on the ring gear means constitute components of the control in respect of the adjusting means for adjusting the lever arms.

The two drive bars or spindles for the carriage on the one hand and the drive gear on the other hand are preferably driven by a common electric motor which can be selectively uncoupled from either one of the drive spindles as required. In accordance with the invention the rotary movement of the electric motor may be controlled by pulse generators. It is also possible however for each of the drive spindles to be provided with its own separate drive.

The position of each adjusting screw corresponds to a given sum of electrical pulses. In other words, when a given number of electrical pulses is applied to the drive means for displacing the drive gear in the longitudinal direction of the nozzle, the drive gear will be known to be set at a position co-operating with a respective adjusting screw. Thus, in accordance with the number of pulses, the drive gear can be precisely set to any desired position of co-operation with a given adjusting screw, thus providing a positional drive, with the number of revolutions of the spindle for displacing the carriage being determined by the magnitude of the control signal. When the drive gear is at the required position, then, when the arrangement uses a common drive means such as an electric motor, the electric motor is uncoupled from the drive spindle for moving the carriage, and is coupled to the drive spindle for rotating the drive gear. That coupling operation is effected for example by electromagnetic means.

Further objects, features and advantages of the apparatus in accordance with the principles of the present invention will be apparent from the following description of a preferred embodiment thereof.

BRIEF DESCRIPTION OF THE DRAWINGS

FIG. 1 is a highly diagrammatic perspective view of a wide-slit nozzle according to the invention, FIG. 2 is a view on an enlarged scale through the nozzle shown in FIG. 1 in cross-section taken along line II—II in FIG. 1, FIG. 3 is a partly sectional side view of the FIG. 1 nozzle.

DESCRIPTION OF THE PREFERRED EMBODIMENT

Figure 4:
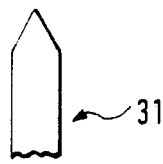
FIG. 4 is a detail from FIG. 3 on an enlarged scale.

Referring firstly to FIG. 1, reference numeral 10 therein indicates the path of movement of a foil web which is not shown in the drawings for the sake of clarity thereof. The foil web is produced by a block-like slit nozzle 12 which is arranged above the foil web, as can be clearly seen from FIG. 1. The nozzle 12 is of a length as indicated by a and a width as indicated by b, of for example 280 mm in this embodiment. Hot molten plastic material passes through the nozzle body as indicated at 14, to a nozzle orifice as diagrammatically indicated at 16 in FIG. 1, which is in the form of a slit extending along the length of the nozzle body 14. Reference numeral 15 denotes an underneath surface of the nozzle body.

Referring now to FIG. 2, the nozzle body 14 comprises first and second nozzle body halves or portions $14_b$ and $14_s$ and the nozzle orifice 16 is defined by a fixed side surface portion 17 on the right-hand body portion $14_s$ on the one hand and a flexible and thus adjustable side surface portion 18 on the left-hand body portion $14_b$ on the other hand. The spacing e between the two side surface portions 17 and 18 determines the width of the nozzle orifice 16.

Arranged below the nozzle orifice 16 in FIG. 2 is a sealing strip 50 of heat-resistant flexible material which selectively covers a portion of the length of the nozzle orifice. The sealing strip 50 is mounted on a pressure bar member 51 of part-circular cross-section. The bar member 51 is connected by means of screw pins 52 to clamping legs 19 having a generally hook-shaped end portion 20 in which the bar member 51 is supported. The polygonal edge configuration $20_k$ of the end portion 20 ensures a firm seat for the bar member 51. Moreover, the bar member 51 can be partially adjusted in respect of the contact pressure thereof, in the legs 19, by virtue of the screw pins 52.

Each of the clamping legs 19 engages under the bar member 51 with its end portion 20, as indicated, while at a position intermediate its length each leg 19 engages behind a projection 22 on the adjacent body portion $14_s$. The leg 19 is braced in position between the body portion $14_s$ and a support surface 23 thereon, by means of a screw member as indicated at $23_a$.

Both the surface 23 and also the underneath boundary surface 15 of the other body portion $14_b$ are inclined towards the nozzle orifice 16 at an angle w, relative to the vertical outside surface 13 of the nozzle body. In addition, lip heating elements 54 which are held in position by bars 55 are provided for better temperature distribution on both sides of the nozzle orifice 16 and adjacent the side surface portions 17 and 18.

Looking now at the body portion $14_b$ which is on the left-hand side in FIG. 2, cut out of the body portion at a spacing i from the underneath surface 15 thereof, by virtue of the provision of a longitudinal cut or slot 24, is a plate portion which is still connected to the nozzle body at the lower end thereof, as can be clearly seen from FIG. 2. As shown also in FIG. 3, a plurality of transverse slots 25 are provided in the above-mentioned plate portion, to define a plurality of lever arms as indicated at 26 in both FIGS. 2 and 3. Each slot 24 and the transverse slots 25 terminate with the lowest points thereof at a small spacing as indicated at k in FIG. 2, from the adjacent movable side surface portion 18.

Reference letter M in FIG. 2 denotes a point between the side surface portion 18 and the lowest part of the slot 24, which is at a spacing t from the free end of the lip portion defined by the side surface portion 18. The point M constitutes a notional rotary axis which extends in the longitudinal direction of the nozzle body, and about which the free end of the lip portion provided by the side surface portion 18 can be deflected to a limited degree. The angle of inclination $W_1$ of the slot 24 relative to a horizontal line passing through the point M is about 45°.

A bending radius r extends from the above-mentioned point M; each lever arm 26 can be limitedly deflected in a plane extending transversely with respect to the side surface portions 17 and 18, as indicated by the arrow x, by means of an adjusting screw 28 which is mounted by its free end in the nozzle body 14. The movement of the lever arm 26 thus varies the width indicated by q at the upper end of the longitudinal slot 24, between the nozzle body 14 and the lever arm 26.

In such deflection movement of the lever arm, the side surface portion 18 which is formed in one piece with the lever arm 26 in this embodiment is also displaced and therewith in that region the width e of the nozzle orifice 16 is altered. A pushing or pulling force is applied to the free end of the lever arm by rotation of the respective adjusting screw 28, the end of which is mounted rotatably in a screwthreaded hole 29 in the nozzle body 14 or in an insert such as a nut or the like which is fitted into the nozzle body.

Fixed on the shank of the screw 28 is a ring gear 30 which can mesh with a spindle gear 32 which is movable above the ring gear 30, such meshing taking place in dependence on the respective position of the gear 32. The free end of the lever arm 26 is fixed substantially without play between the head of the screw 28 and the ring gear 30.

In order to ensure a high degree of operational reliability in respect of the mutually meshing components ring gear 30 and gear 32, the teeth 31 on the ring gear end and screwthread configuration on the gear 32 are pointed at their ends, as shown in FIG. 4.

Referring still to FIGS. 2 and 3, the gear 32 is disposed in a recess 33 in a carriage 34 which is slidable on guide bars or rods 36 above the free ends of the lever arms 26, as can be clearly seen from FIG. 3. Reference numeral 37 denotes a spindle rod or bar with an outside screwthread 48 for the carriage 34, the screwthread 48 engaging with an inside screwthread which is only indicated at 49 in FIG. 3, in the carriage 34. A drive rod or spindle 38 extends through the gear 32 approximately perpendicularly to the adjusting screws 28. In the illustrated embodiment the spindle 38 is provided with four longitudinally extending ribs 39 thereon, as most clearly shown in FIG. 3, the ribs engaging as drive means into grooves (not shown) in the gear 32. Both the spindle 37 and the spindle 38 are arranged to be connected by way of drive end portions 37e and 38e respectively to a drive means which is not shown in FIG. 3. Each spindle may have its own drive means or the arrangement may comprise a common drive means for the two spindles, with suitable coupling means to provide for selective coupling and uncoupling between the spindles and the drive means. The drive means may be for example an electric motor, together with a rotary pulse generator for controlling the rotary movement thereof.

Referring now again to FIG. 2, it will be seen therefrom that a segment-shaped portion has been removed from the periphery of the gear 32, producing a surface portion 40 which extends along a chord of the gear. Thus, in the illustrated position of the gear 32, for movement thereof along the spindle 38, the gear 32 is capable of moving freely along the spindle 38 without meshing with the respective ring gears 30, by virtue of being disposed above same at a small distance as indicated by n. In an alternative embodiment a plurality of segments may also be cut off the gear 32.

The carriage 34 which is heat-insulated relative to the nozzle body 14 as indicated by the portion 42 in FIG. 2, is covered by a cover member 43 and can be guided quickly and accurately over the ring gears 30 by means of the spindle 37 and the above-mentioned drive means such as a stepping motor. As indicated above, the arrangement may have a common drive which thus also rotates the gear 32. When the gear 32 is in a condition of meshing with the respective ring gear 30 beneath same, the corresponding lever arm 26 is moved, thereby also moving the part of the movable side surface portion 18, namely the lip portion provided thereby, which is thus carried on, for example formed on, the other end of the lever arm 26.

Figure 5:
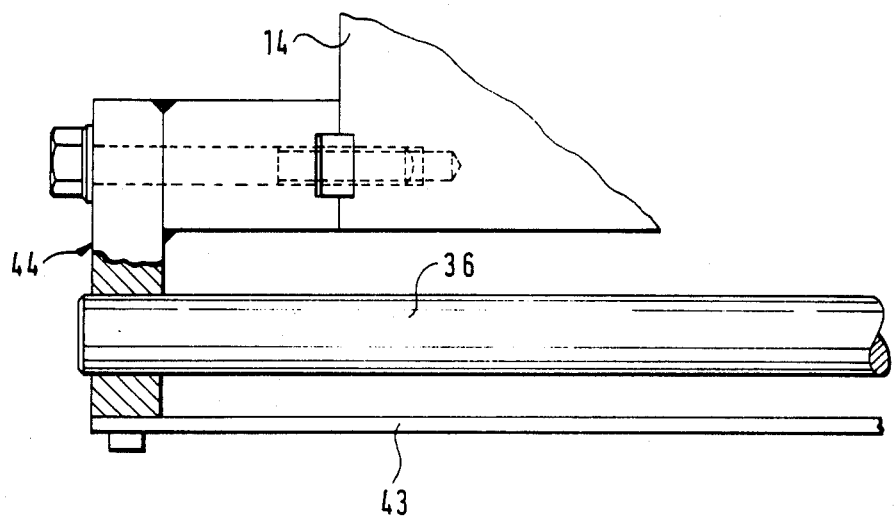
FIG. 5 is a part of the FIG. 3 view.

Reference will be made at this point to FIG. 5 which shows a releasable mounting arrangement comprising mounting angle members 44 for the guide rods or spindles 36 of the carriage 34 and the cover member 43, on the nozzle body 14. The members 44 also carry ball bearing arrangements as indicated at 45 in FIG. 3, for the respective rods or spindles 37 and 38.

As indicated above, the movements of the carriage 34 and the rotary movement of the gear 32 may be controlled by a single drive means such as an electric motor, with the rotary movement thereof in turn being controlled by a rotary pulse generator arrangement. Instead of a common drive, it would also be possible to use separate drives for the spindle 37 and the spindle 38.

When using a rotary pulse generator arrangement, the position of each screw 28 corresponds to a given number of electrical pulses. It is thus possible to set the gear 32 at any desired position, with a high degree of accuracy, by reference to the number of pulses produced.

When the carriage 34 has been moved into the required position with its gear 32, by operation of the spindle 37, the drive is switched over, for example by electromagnetic actuating means, from driving the spindle 37 to driving the spindle 38. Immediately thereafter the ring gear 30 on the associated screw 28 is rotated through 360° by way of the rotary movement of the spindle 38, by means of the gear 32. Depending on the number of pitch turns on the gear 32, the ring gear 30 meshing therewith rotates and thereby axially displaces the adjusting screw 28. By virtue of that movement of the screw 28, the free end of the lever arm 26 is also moved and the width of the nozzle orifice 16 can thus be adjusted, to a very fine degree.

The carriage 34 remains in the selected position until the measurement result afforded by the alteration in the width of the nozzle orifice 16 is known. The period of time between correction operations is dependent on the position of the screw 28 and the transversing speed of the measuring head for measuring the change in thickness of the extruded article. The carriage movement is faster than the measuring head speed and thus the reaction time of that system is within the measuring period.

Depending on the deviation in respect of the thickness of the extruded article or coating from the reference thickness, as indicated by the measuring system, the nozzle orifice 16 has to be opened up or closed down, in order thereby to make the extruded film thicker or thinner at the appropriate location.

The width of the nozzle orifice 16, as indicated at e in FIG. 2, is increased or reduced solely by rotary movement of the gear 32 in the appropriate direction, after actuation of the drive means in the appropriate fashion.

The respective screw 28 is therefore screwed into or out of the nozzle body 14, whereby the movable side surface portion or lip portion 18 is urged inwardly or outwardly to open or close the nozzle orifice 16 to a greater or lesser degree.

The extent of the nozzle orifice correction movement may be greater or smaller, depending on the number of turns on the gear 32 and the pitch of the ring gear 30 or the adjusting screw 28.

It will be appreciated that the configuration of the lever arm system described above provides a step-down effect in regard to the transmission of adjusting movement from the adjusting screw 28 to the side surface or lip portion 18 for varying the width of the nozzle orifice, so that the displacement of the lip portion 18, for each revolution of the gear 32, is very small, thus providing a highly accurate correction movement for the lip portion 18.

It will be appreciated that, with the above-described system, it is possible to predetermine the necessary number of revolutions of the gear 32, thereby very quickly to attain the required value in respect of the thickness of the extruded article or coating, in dependence on the magnitude of the difference between the reference value and the actual value in respect of the thickness of the extruded article or film, as ascertained by way of the measuring system.

The above-described apparatus has inter alia the following advantages:

direct, mechanical adjustment of the movable side surface portion or lip portion 18;

very short adjustment time due to direct intervention without any noticeable delay (in terms of seconds) between direct measurement result, correction order and actual correction (the reaction time is within a measuring period of the measuring equipment);

the size of the nozzle orifice once set remains unchanged, without subsequent variation, and there are also no thermal influences affecting same;

the system can be graduated in nature from manual operation to semi-automatic operation or even fully-automatic operation with computer-aided control; and the length of the lever arms permits adjustment in a finely graduated form and has a damping action, both in a thermal and in a mechanical context.

Furthermore the major part of the mechanical components can be produced by automatic machine tools.

It will be appreciated that the apparatus also has a low energy requirement as for example it does not require continuous heating or cooling of pins, as in the above-described previous arrangements.

It will be appreciated that the above-described construction in accordance with the invention has been set forth solely by way of example and illustration thereof and that various other modifications and alterations may be made therein without thereby departing from the spirit and scope of the invention.

I claim:

1. A slit nozzle for an extruder for plastic material which comprises: a nozzle body including a first and second side surface portions, at least one of said side surface portions being in the form of a flexible lip portion; a nozzle orifice defined by said first and second side surface portions; adjusting means operatively connected to said lip portion for displacing same to vary the size of the nozzle orifice by flexing the lip portion, said adjusting means including a mechanical actuating means; and a plurality of lever arms separated from each other operatively connected at one end to the flexible lip portion and at the other end to said mechanical actuating means for producing deflection movement of the lever arm in a plane which extends transversely with respect to the side surface portions of the nozzle body; wherein said adjusting means is operative to independently adjust each lever arm so that the region of the side surface portion forming the flexible lip portion is rotatable about a rotary axis.

2. A nozzle as set forth in claim 1 wherein each of said lever arms has a first end formed on said lip portion and wherein said lever arms are partially separated from the nozzle body by a slot extending longitudinally through the nozzle body, the slot terminating at a small spacing from the nozzle orifice.

3. A nozzle as set forth in claim 2 wherein a notional rotary axis for the movement of said lip portion extends between said nozzle orifice and the part of said slot which is most closely adjacent to said nozzle orifice.

4. A nozzle as set forth in claim 2 wherein said plurality of said lever arms are formed out of a plate portion on the nozzle body by virtue of the plate portion being divided into the respective lever arms by at least one transverse slot, the plate portion being divided from the nozzle body by said longitudinal slot.

5. A nozzle as set forth in claim 4 wherein said plurality of lever arms are each delimited by a respective transverse slot, said transverse slots extending parallel to each other.

6. A nozzle as set forth in claim 1 wherein the thickness of the lever arms as measured in a plane extending transversely with respect to said side surface portions decreases towards the end of the lever arm which is remote from said lip portion.

7. A nozzle as set forth in claim 1 wherein said side surface portion which is in the form of a flexible lip portion is engaged by said lever arms which is made up of a plurality of portions.

8. A nozzle as set forth in claim 1 wherein said adjusting means has a pin means mounted in the nozzle body, for producing said deflection movement of said lever arms.

9. A nozzle as set forth in claim 8 wherein said pin means is in the form of an adjusting screw and the adjusting screw is mounted with a free end portion thereof in the nozzle body.

10. A nozzle as set forth in claim 9 wherein said nozzle body has a screwthreaded hole therein, into which said screw is screwed.

11. A nozzle as set forth in claim 9 wherein said nozzle body has an insert therein, the insert having a screwthreaded hole into which said screw is screwed.

12. A nozzle as set forth in claim 8 wherein said pin means carries a ring gear means and said nozzle body carries a gear, and further including means for displacement of said gear in the longitudinal direction of the nozzle, the gear being adapted to mesh with said ring gear means.

13. A nozzle as set forth in claim 12 wherein said pin means has a head portion and wherein the free end of said lever arms are held substantially without play between said head portion of said pin means on the one hand and said ring gear means on the other hand.

14. A nozzle as set forth in claim 12 wherein said ring gear means has a toothed periphery and wherein said gear is adapted to be brought selectively into meshing engagement with the toothed periphery of a respective said ring gear means.

15. A nozzle as set forth in claim 12 and comprising a drive spindle mounted rotatably in the nozzle body, said gear being axially movable on said drive spindle and rotatable therewith.

16. A nozzle as set forth in claim 12 wherein said gear has a surface portion which interrupts the periphery thereof and which is defined by the removal of a segment-like portion, said surface portion being disposed at a small spacing from said ring gear means when said gear is in a position for displacement thereof in the longitudinal direction of the nozzle.

17. A nozzle as set forth in claim 16 and comprising a plurality of segment-like portions at the periphery of said gear.

18. A nozzle as set forth in claim 15 wherein the drive spindle is provided with at least one engagement means co-operating with a further engagement means on said gear.

19. A nozzle as set forth in claim 18 wherein said engagement means on said drive spindle comprises a recess and the further engagement means on the gear comprises a projection thereon.

20. A nozzle as set forth in claim 18 wherein said engagement means on said drive spindle comprises a projection thereon and said engagement means on said gear comprises a recess therein.

21. A nozzle as set forth in claim 12 and further including guide bar means extending longitudinally of the nozzle, and a carriage movable on the guide bar means in the longitudinal direction of the nozzle, the gear being carried by said carriage.

22. A nozzle as set forth in claim 21 and further comprising a drive spindle having an external screwthread meshing with a co-operating screwthread on the carriage, for movement thereof.

23. A nozzle as set forth in claim 22 comprising a drive spindle mounted rotatably in the nozzle body, said gear being axially movable on the drive spindle and rotatable therewith, and means for driving the drive spindle of the carriage and means for driving the drive spindle of said gear.

24. A nozzle as set forth in claim 23 wherein said drive means comprise a common drive means for the carriage drive spindle and the gear drive spindle.

25. A nozzle as set forth in claim 24 wherein said drive means is adapted to be selectively coupled to a respective one of the drive spindles.

26. A nozzle as set forth in claim 23 wherein said drive means comprises an electric motor and a rotary pulse generator for controlling the rotary movement thereof.

27. A nozzle as set forth in claim 23 comprising a measuring means for detecting the thickness of extrudate produced from the nozzle, means for comparing said thickness to a reference value, and means for using the actual value/reference value difference as a signal for controlling the drive means.

28. A nozzle as set forth in claim 21 including at least one sealing strip means adapted to cover at least a portion of said nozzle orifice, and a pressing bar means supporting said sealing strip means and urging it towards said nozzle orifice.

29. A nozzle as set forth in claim 28 and further comprising at least one clamping leg for holding said pressing bar means urged towards said nozzle orifice.

30. A nozzle as set forth in claim 29 wherein said clamping leg has a polygonal edge configuration defining a mounting means for the pressing bar means which is of a part-circular cross-section.

31. A nozzle as set forth in claim 29 wherein said clamping leg bears on the one hand against said pressing bar means and on the other hand co-operates with a projection portion on said nozzle body, the clamping leg engaging behind said projection portion, and further including an adjusting screw adapted to brace said clamping leg relative to the nozzle body.

32. A nozzle as set forth in claim 29 wherein said sealing strip means, said pressing bar means and said clamping leg are structurally separated from said flexible lip portion.

33. A nozzle as set forth in claim 21 and further including a housing within which said carriage is movable.

* * * * *